United States Patent [19]
Gaquere

[11] Patent Number: 5,581,867
[45] Date of Patent: Dec. 10, 1996

[54] PROCESS FOR RIVETING MATERIALS BY MEANS OF A BLIND RIVET, AND CORRESPONDING BLIND RIVETS

[76] Inventor: Jean-Pierre Gaquere, 16 rue Charles de Gaulle, 80560 Mailly Maillet, France

[21] Appl. No.: 332,461

[22] Filed: Oct. 31, 1994

Related U.S. Application Data

[63] Continuation of Ser. No. 920,441, Oct. 13, 1992, abandoned.

[30]  Foreign Application Priority Data

Dec. 20, 1990 [FR] France .................................. 90 16028

[51] Int. Cl.$^6$ ................................................. B21J 15/02
[52] U.S. Cl. ........................... 29/525.06; 29/446; 29/512; 29/525.03; 411/43; 411/69; 411/70
[58] Field of Search .......................... 29/446, 512, 524.1, 29/525.03, 525.04, 525.06, 525.07; 411/39, 40, 43, 44, 45, 69, 70

[56] References Cited

U.S. PATENT DOCUMENTS 3,276,308  10/1966  Bergere ............................... 29/524.1 X
3,277,771  10/1966  Reynolds ............................ 29/524.1 X
3,460,429   8/1969  La Torre ............................. 29/524.1 X Primary Examiner—Joesph M. Gorski
Attorney, Agent, or Firm—Harold H. Dutton, Jr.; W. Charles L. Jamison; Diane F. Liebman

[57]  ABSTRACT

The present invention relates to a process for riveting materials by means of a blind rivet and corresponding blind rivets. The process of the invention in particular carries out the step of stretching the body of the sleeve (31) before blocking it from one part to another of an assemblage (13, 14) between an abutment head (50) and a blocking head (51). The extending of the body of the sleeve is especially permitted by the cooperation of a stop means (44) with a shoulder (36a) of the shank of the mandrel (32), and by the pulling exerted on the mandrel. The present invention also relates to blind rivets adapted to be set by the process of the invention.

9 Claims, 3 Drawing Sheets

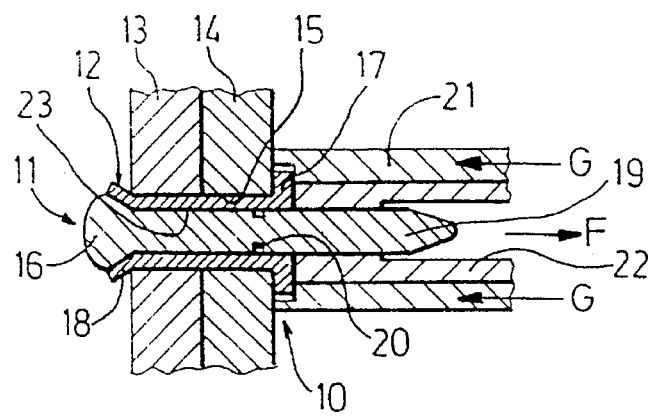
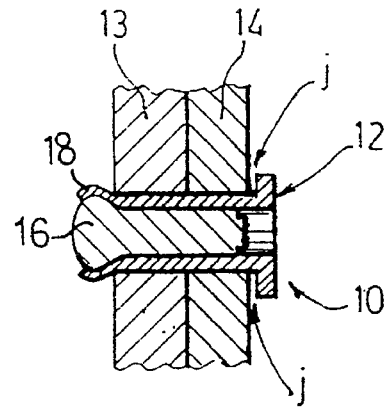
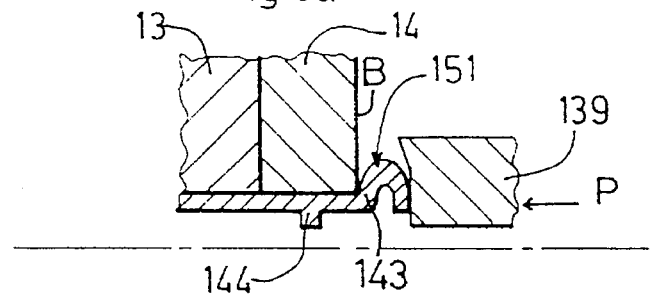
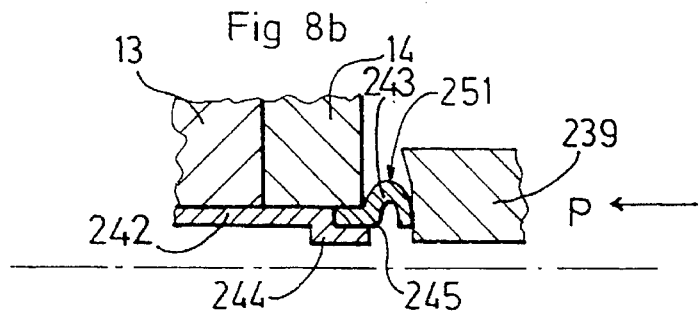
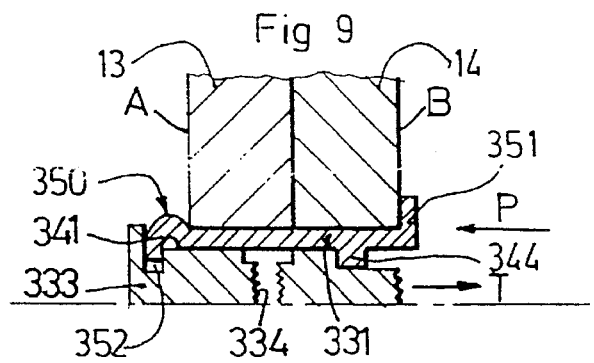

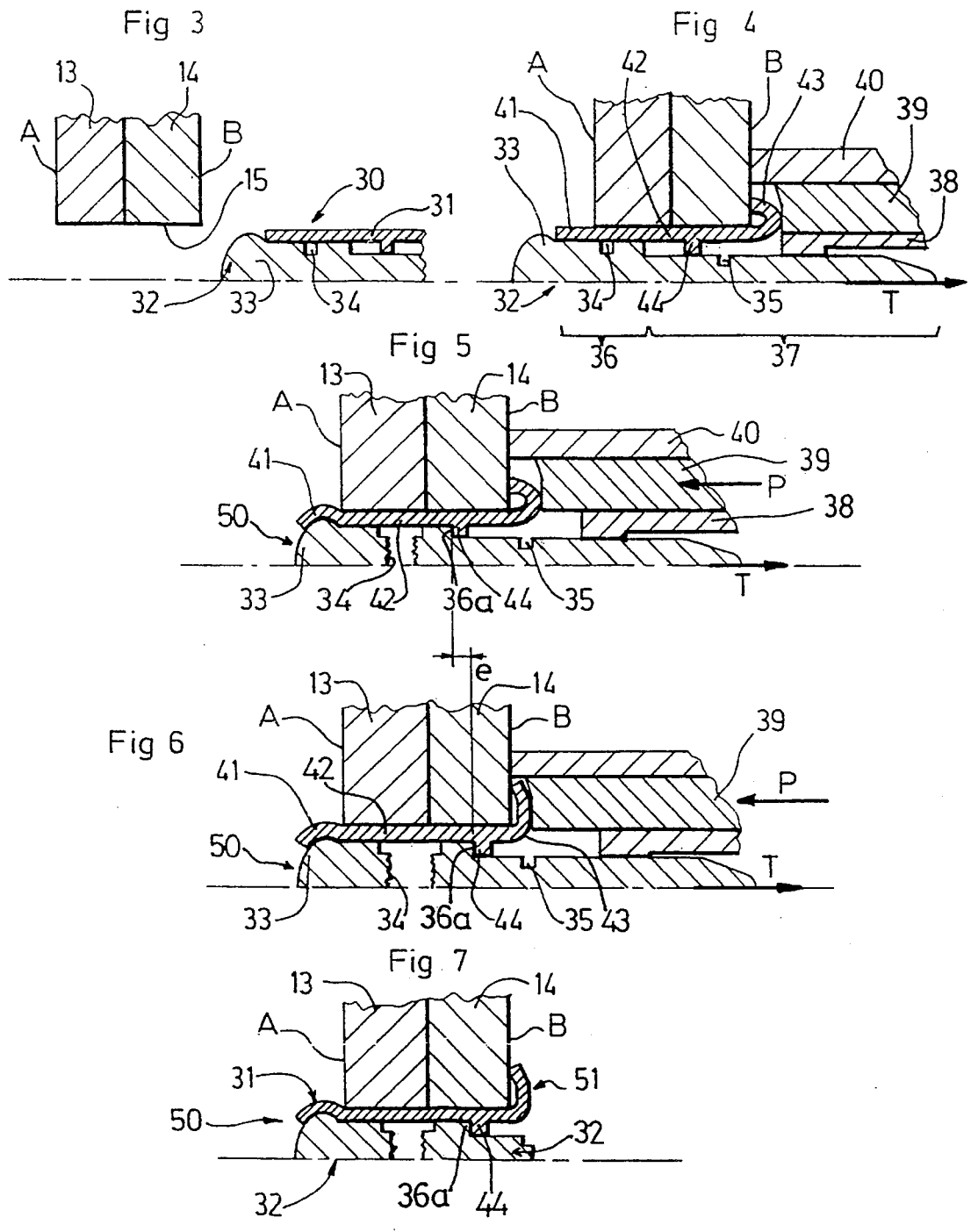

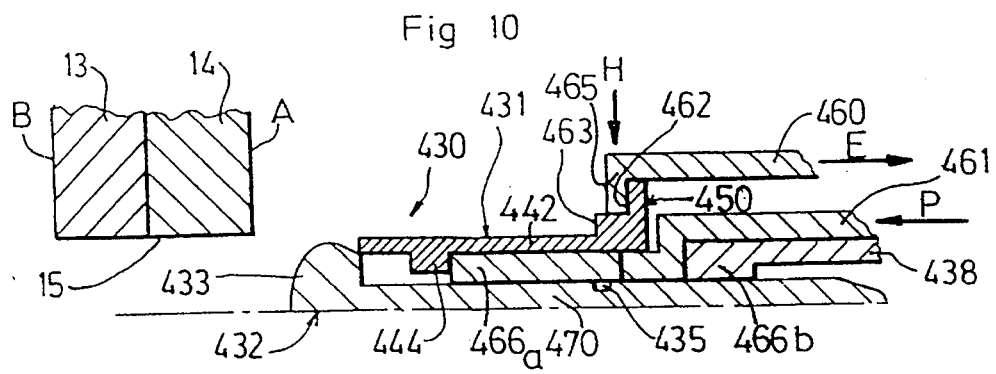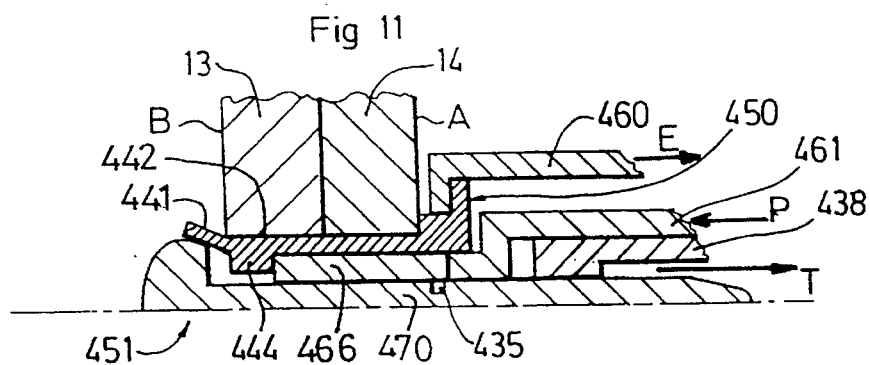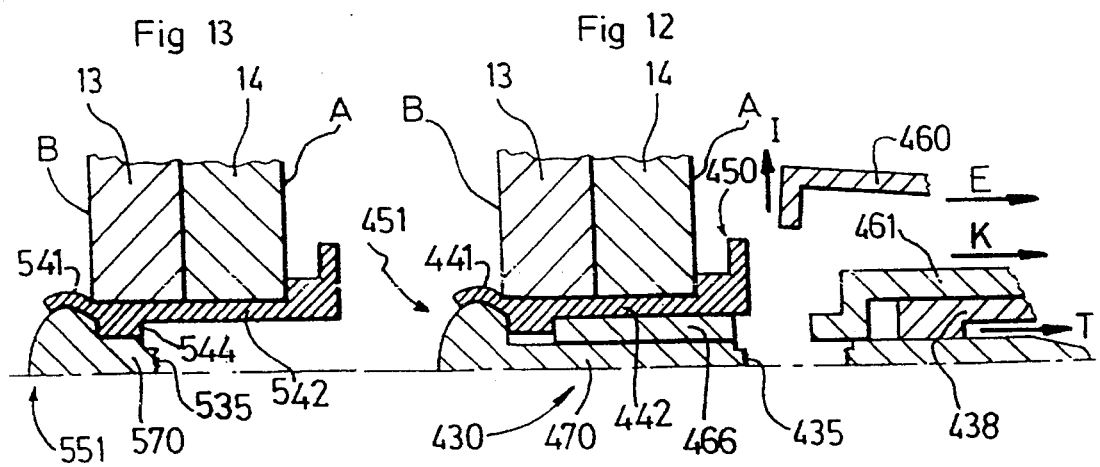

PROCESS FOR RIVETING MATERIALS BY MEANS OF A BLIND RIVET, AND CORRESPONDING BLIND RIVETS

This application is a continuation of Ser. No. 07/920,441 filed Oct. 13, 1992 now abandoned.

BACKGROUND AND OBJECTS OF THE INVENTION

The present invention relates to a process for riveting with a blind rivet, and to corresponding blind rivets.

Blind rivets are generally comprised by a tubular sleeve with a longitudinal bore, and a mandrel comprising, for one part, a head of the mandrel having a diameter greater than that of the bore of the sleeve, and for the other part, a shank housed in the bore of the sleeve and extending therefrom at the end of the sleeve opposite to the head of the mandrel. Such rivets are adapted after pulling on the shank of the mandrel to form a head of the blind rivet, by introducing the head of the mandrel into the end adjacent the sleeve, and for maintaining the materials together between a preformed head of the sleeve and the blind head.

The shank of the mandrel is adapted to be broken upon completion of the riveting, in order that it not extend from the sleeve.

These rivets are called "blind" because they are introduced and set it place in the pieces to be assembled, from just one side of the assembly. Such placement is necessary when one of the sides of an assembly is not accessible.

Once set, the blind rivet subjects the assembly of materials to compressive forces of a known type. However, after stopping application of the forces necessary for setting the rivet, the effect of compression on the assembly has a tendency to be relaxed by a hysteresis effect, such that an axial relaxation leading to a disadvantageous loosening is produced. The sleeve and the assembly then have created between them a certain play, which is harmful to good securing of the assemblage, and creates a poor fastening of the different elements between themselves.

The present invention has as its object to overcome all of these drawbacks by providing a riveting process by means of blind rivets, resulting from a correct fastening, and having no tendency to be relaxed, and not creating disadvantageous play between the different elements being assembled.

The invention provides also for the provision of rivets enabling carrying out such a process.

DESCRIPTION OF THE INVENTION

To this end, the present invention relates to a riveting process for materials by means of a blind rivet comprising a tubular sleeve provided with a longitudinal bore, and a mandrel having, for one part, a head of a diameter greater than the bore of the sleeve, and for the other part, a shank housed in the bore of the sleeve and extending therefrom opposite the head, the process comprising:

a) introducing the rivet into an opening passing through the materials to be assembled, from one side of this assembly of materials, and being characterized in that it comprises furthermore:

b) exerting on the sleeve an extension force between a stop head situated at one end of the sleeve, and a stop means provided on the interior of the sleeve for placing said sleeve in longitudinal extension over a substantial portion of its length, c) blocking the sleeve in this position of longitudinal extension from one part to the other of the assembly while shaping a blocking head opposite the stop head in contact with a first support face of the assembly, said blocking head resting against a second rest face of the assembly, and d) exerting a pulling force on the mandrel for causing a rupture of the shank of the mandrel.

This riveting process, by reason of the extension of the sleeve before being blocked between parts of the assembly, permits obtaining an assembly which is under compression after setting, and which therefor has no tendency, over time, to be relaxed.

In the process according to the invention, the introduction of the blind rivet into a bore passing through the materials to be assembled may be carried out before or after stretching of the sleeve. One thus obtains two types of assembly by blind rivets both having an intimate contact between the pieces to be assembled and the rivets, but differing by the secondary effects, such as the resistance to shear stresses, as well as machining, permitting production of these assemblies.

In a first embodiment, the blind rivet is introduced into a bore formed through the pieces to be assembled from only one of the sides of the assemblage, preliminarily to the extension of the sleeve. In this case, the sleeve of the blind rivet used has a preformed head which is placed into contact with one of the faces of the assemblage. The blind head, also called the abutment head, is then formed by pulling on the shank of the mandrel in a conventional manner. The placing of the sleeve under tension is carried out after a first rupture of the shank of the mandrel. An extension force is applied between the abutment head and a support means arranged on the sleeve. This extension has a tendency to release the preformed head of the sleeve from the assemblage. This preformed head is then reshaped while pushing it against the assembly for blocking the sleeve in the extension position, from one part to the other of this assembly.

Thus, in this process, traction or pulling force exerted on the mandrel is used a first time for forming the stop head before the first rupture Of the shank, and a second time for carrying out an extension of the sleeve after the first rupture of this shank.

Such a process permits using conventional setting tools for placing and setting blind rivets and may therefore be carried out without major modification of existing riveting installations.

When extension of the sleeve is carried out preliminarily to the introduction of the rivet into a bore provided through the pieces to be assembled, or (for this same type of rivet) preliminarily to the provision of the blocking head, specific tools are used for carrying out this extension.

The sleeve is then extended between a first tool exerting a tension on the abutment head of the sleeve and a second tool pushing on a stop means secured to this same sleeve.

The stretched sleeve is then introduced into the pieces to be assembled, and blocked in the extension position, by pulling on the shank of the mandrel. This pulling causes the formation of a blocking head, and the sleeve thus squeezes the assembly closely together while being drawn. The continued exertion of the pulling force on the shank of the mandrel causes the rupture of this shank, in a known manner.

According to this process, the second setting tool can be comprised of a single piece and can be withdrawn from the sleeve after the riveting, or may be comprised of two parts. Advantageously, the two piece construction permits leaving the first part of the second tool in place inside the sleeve, after riveting. Only the second part of the second tool is withdrawn.

Advantageously, such a process achieves a riveting providing a good contacting of the materials, but in addition, by reason of the presence of the first part of the second tool in the sleeve, a better shear resistance is achieved, as well as a propitious expansion of the rivet.

Such a process requires, however, carrying it out with specific setting apparatus.

The present invention also relates to a blind rivet comprising a tubular sleeve provided with a longitudinal bore and a mandrel presenting, for one part, a head of a diameter greater than the bore of the sleeve, and for the other part, a mandrel shank housed in the interior of the bore and adapted to extend from this bore on the side opposite the head of the mandrel, said rivet being characterized in that it comprises:

at the level of the sleeve:
    a preformed head at the end of the sleeve opposite the head of the mandrel, and
    a stop means arranged on the interior of the bore of the sleeve, and
at the level of the mandrel:
    a shank having first and second portions, and
    first and second rupture grooves provided about the circumference of the shank of the mandrel respectively in the first and second portions of the shank of the mandrel.

Such a rivet is adapted, after double rupture of the shank of the mandrel, to provide a riveting under compression, with a good seating of the materials presence.

Such a rivet may advantageously be put in place with the help of known tools without major modifications thereof.

Advantageously, the stop means provided on this rivet may be removable. For example, it may be separated from the sleeve at the end of the riveting process, or it may be deformed in order not to form an obstacle to the removal of the shank of the mandrel when ruptured at the first rupture line.

The present invention relates also to a rivet able to be extended before its introduction into the materials to be assembled.

Such a rivet is of the type comprising a tubular sleeve provided with a longitudinal bore and a mandrel having, for one part, a head of a diameter greater than the bore of the sleeve, and for the other part, a mandrel shank housed on the interior of the bore of the sleeve and adapted to extend from this bore from the side opposite the head of the mandrel, said rivet being characterized in that it comprises in addition:

at the level of the sleeve:
    a preformed head at the end opposite the head of the mandrel, said head having a gripping surface for a first sleeve extending tool and a rest or support surface against a first face of an assemblage of materials to be assembled,
    a stop means provided on the interior of the bore of the sleeve adapted to form a pressure surface for a second tool for stretching the sleeve, and:
at the level of the mandrel:
    a mandrel shank having one rupture groove.

This rivet has the advantage of presenting a conventional mandrel shank, with a single rupture groove.

The abutment head of this rivet is advantageously provided with a gripping surface for cooperating with a gripping means carried by the first setting tool, permitting this tool to pull on the sleeve. This gripping means may be of any type, for example cooperation of two shoulders, or cooperation of a lug in an annular groove, or cooperation of a jaw and two notches distributed around the preformed head and adapted to receive a corresponding jaw of the first setting tool.

Advantageously, such type of rivet may also be extended after its placement in the bore of the assembly, as the rivet in the first embodiment.

Advantageously again, the rivets according to the invention may be provided with stop means forming a continuous or discontinuous projection on the interior of the bore of the sleeve.

DESCRIPTION OF THE DRAWINGS

Other objects, characteristics and advantages of the present invention will become apparent from the description which follows, by way of non-limiting example, with reference to the accompanying drawings, in which:

FIG. 1 is a longitudinal cross sectional view showing a blind rivet of a known type, during its setting in the materials to be assembled;

FIG. 2 is a view similar to FIG. 1 showing a blind rivet of a known type, after being set in place;

FIG. 3 is a longitudinal cross-section view of a rivet according to a first embodiment of the invention, before its placement in the materials to be assembled;

FIGS. 4 to 7 are views similar to FIG. 3 showing the successive steps of riveting the materials to be assembled;

FIGS. 8a and 8b are cross-sectional views showing the provision of a blocking head according to the invention, according to first and second variations;

FIG. 9 is a cross-sectional view showing a variation of the provision of the abutment head according to the invention;

FIGS. 10 to 12 are longitudinal cross-sectional views showing a second embodiment of the rivet according to the invention during different steps of the riveting; and FIG. 13 is a cross-sectional view showing a first variation of the second embodiment according to FIGS. 10 to 12.

DETAILED DESCRIPTION OF THE PREFERRED EMBODIMENTS

As shown in FIGS. 1 and 2, it is already known to assemble two materials 13, 14 by means of a blind rivet 10.

This rivet is termed "blind" because it is set in place from one side of the assembly, the other side not being accessible. In the accompanying drawings, the blind side is arbitrarily the left side in each figure.

Blind rivets 10 known up to the present (FIG. 1) comprise a tubular sleeve 12 provided with a longitudinal bore 23, and a mandrel 11 having a head 16, of a diameter greater than the bore 23 of the sleeve, and a shank 19. This shank 19 of the mandrel is housed within the bore 23 of the sleeve and extends therefrom on the side opposite the head 16 of the mandrel. A rupture groove 20 is provided on the shank of the mandrel.

For setting of this rivet, a pulling force is exerted in the direction of the arrow F (FIG. 1) by means of a tool having pincers 22 gripping the shank of the mandrel 19. Simultaneously, the preformed head 17 of the sleeve is pressed (arrows G in FIG. 1) against the assembly 13, 14 by means of a setting tool 21.

In the first stage, while the pulling force F is being applied to the mandrel 19, the provision of a blind head of the rivet is generated by forcing the head of the mandrel 16 into the end 18 of the sleeve. This head is blocked against the assembly 13, 14 and tends to urge these two materials against each other to the maximum. Once this blind head forms and blocks in position, continued pulling in the direction F causes, in a second stage, the rupture of the shank of the mandrel 19 at the rupture groove 20.

The rivet is then shaped as shown in FIG. 2. It will be noted that by reason of a relaxing phenomenon of the materials having been subjected to the pulling force F, an amount of play j has a tendency to be created between the head of the sleeve 12 and the assembly 13, 14. In effect, the sleeve, having been subjected to a compressive force under the effect of the pulling or tensioning of the shank of the mandrel, returns to its initial length, thus causing this play j between the elements being assembled. The seating of the sleeve 12 and the pieces 13, 14 being assembled is thus poorly achieved. This play has in addition a tendency to increase with time.

The present invention seeks in particular to overcome this drawback.

To this end, according to the embodiment shown in FIGS. 3 to 7, the sleeve 31 of the rivet 30 according to the invention is subjected to an extension or stretching during its placement.

A first embodiment of the riveting according to the invention is described hereafter.

The rivet 30, comprised of the sleeve 31 and the mandrel 32 inserted into the sleeve, is introduced into the bore 15 of the two materials 13 and 14 being assembled (FIG. 3). This introduction is carried out from one of the sides of the assembly, in the example from the right side (the left side being assumed to be inaccessible).

As is better seen in FIG. 4, the sleeve of the rivet according to the invention comprises a preformed head 43 that a setting tool 39 brings into contact with a second face B of the assembly 13, 14. The tool in the form of pincers 38 grips between its jaws the end 37 of the shank of the mandrel opposite the head of the mandrel 33.

The sleeve 31 according to the invention is provided with a stop means 44 positioned in the internal bore of the sleeve. In the example shown, this stop means is an annular shoulder projecting to the interior of the bore.

The mandrel 32 according to the invention itself comprises, in addition to its head 33, a first part 36 provided with a first rupture groove 34 and a second part 37 provided with a second rupture groove 35.

The cross-section of the first part of the shank 36 is adapted to correspond to that of the internal bore of the sleeve in its portion of greatest cross-section. The cross-section of the second portion of the shank is adapted to correspond to the cross-section of the internal bore of the sleeve at the level of the stop means 44. Thus, the diameter of the first and the second portions of the shank of the mandrel are decreasing.

As shown in FIG. 4, a counteracting setting tool 40 rests on the second face B of the materials 13 and 14.

In the process step shown in FIG. 4, the preformed head 43 of the sleeve 31 is simply caused to rest against the second face B of the assembly.

The end 41 of the sleeve adjacent the head of the mandrel 33 is not yet deformed. A pulling force T is then exerted on the second part 37 of the shank of the mandrel, while pushing (arrow P, FIG. 5) the setting tool 39 in the opposite direction to the pulling force. As a result there is a progressive deformation of the end 41 of the sleeve adjacent to the head of the mandrel 33 and an insertion of this head 33 into the interior of the end of the sleeve 41. The stop head 50 thus formed comes into abutment against a first face A of the assembly 13, 14, itself resting by its second face B against the preformed head 43 of the sleeve.

While the stop head 50 is formed and is blocked against the first face A of the assembly, through the action of the opposing forces P and T, continued pulling T causes rupture at the first rupture groove 34 (FIG. 5). The rest of the first portion of the shank of the mandrel 36 is then carried along with the second portion of the shank of the mandrel 37, still subjected to the traction T.

The first portion of the mandrel 36 cooperates then by its end 36a, with the shoulder 44 for extending the tubular body 42 of the sleeve between the abutment head 50 and the shoulder or stop means 440

During this extension e (FIGS. 5 and 6), the setting tool 39 continues to push against the preformed head 43. The extension e has, in effect, a tendency to separate this head 43 from the second face B of the assembly. The setting tool 39 then reshapes the head 43 for bringing it into contact with this face, in such a manner as to create a blocking head 51.

When the extension of the body of the sleeve reaches its maximum, continued pulling T on the second portion 37 of the shank of the mandrel causes rupture at the second rupture groove 35 (FIGS. 6 and 7).

The sleeve 31 then squeezes the assembly 13 and 14 firmly between an abutment head 50 and a blocking head 51, reshaped during setting, in order to retain the extension e of the body of the sleeve obtained during setting of the rivet.

For this reason, even after relaxation of the materials subjected to the different forces present, there is no longer any play j appearing between the blocking head 51 of the sleeve and the assembly 13, 14.

The seating of the rivet and the materials to be assembled is thus correctly achieved, and has no tendency to relax over time.

Such a type of rivet is easy to set in place because it does not require special setting equipment. In effect, the setting equipment used heretofore for conventional rivets may be used without major modification.

The riveting obtained is clearly improved, by reason of an intimate seating between the materials 13 and 14, and the sleeve 31 of the rivet 30.

Such type of rivet presents, by reason of the double rupture of the first and second parts 36, 37 of the shank of the mandrel, a resistance to shear stresses similar to existing rivets. This resistance to shear stresses may be improved, as will be seen below, in the second embodiment of the invention.

Different variations of the embodiment may be used for the formation of the blocking head 51, as shown in FIGS. 8a and 8b.

As shown in FIG. 8a, the preformed head 143 of the sleeve of the rivet may be reshaped during riveting by buckling. In this case, the setting tool 139 exerts a pressure P and forces the blocking head 151 against the second face B of the assembly 13, 14.

It should be noted that for reasons of clarity, FIGS. 8a and 8b only show certain of the tools used for carrying out the riveting.

As shown in FIG. 8b, the end of the sleeve provided with the preformed head 243 may be produced of a metal more malleable than the body of this sleeve 242. This metal is connected for example by screw threads 245 to the body of the sleeve. The formation of the blocking head 251 is thus found to be easily provided.

According to a third variation of the embodiment able to be combined with the first embodiment, or one or the other of the variations shown in FIGS. 8a and 8b, the abutment head 350 may, itself, be produced by buckling (FIG. 9). In this case, a holding groove 352 is provided below the head 333 of the corresponding mandrel for receiving the end 341 of the sleeve. During the traction T, this end 341, thus held, permits providing the abutment head 350 by buckling and blocking this head against the first face A of the assemblage 13, 14. The rest of the riveting process remains unchanged.

In a variation, it is possible to carry out the process in such a manner that the rest means is broken once the blocking of the abutment and blocking heads is carried out and before the rupture of the shank of the mandrel at the second rupture line. For example, the rest means may be provided to this effect with a rupture groove in the area of its connection with the body of the sleeve.

In still another variation, this rest means may be deformed for allowing exit of the part of the mandrel situated after the first rupture line, when the stretched sleeve is blocked between the abutment head and the blocking head.

A clean riveting is thus obtained in which there remain no parts of the shanks of the mandrel susceptible of vibrating or moving. However, the resistance to shear stresses for such a rivet is less.

As indicated above, the invention also relates to a second embodiment of a rivet (FIGS. 10 to 13) in which the fastening, and also the shear resistance, are improved.

With this second type of rivet 430, the placement of the abutment head 450 and the blocking head 451 is reversed with respect to the first embodiment. In order to keep a similarity of the description with respect to the first embodiment, the first and second faces A and B of the assemblage 13, 14 have therefor also been reversed. In the same manner, for greater clarity, the elements of this second embodiment having the same functions as in the first embodiment have been assigned the same reference characters preceded by the numeral 4. Thus, the reference to the rivet 30 in the first embodiment becomes the rivet 430 in the second embodiment.

In the framework of this second embodiment, it will be noted that the tensioning or extension of the body of the sleeve 442 is preliminary to its introduction into a bore 15 through the materials 13, 14 being assembled.

This extension is achieved due to first and second setting tools 460, 461 exerting an extension force between an abutment means 444 and an abutment head 450. The stretching is thus achieved through the action on the same elements as previously.

According to this second embodiment, the rivet 430 includes a sleeve 431 having a tubular body 442 and a longitudinal bore. A stop means 444 is arranged in the longitudinal bore. In the case shown, this stop means is an annular shoulder projecting into the bore in the sleeve. The sleeve 431 has, opposite this stop means, a preformed head 450 having a holding surface 462 and a supporting surface 463, respectively for contact with the first tool 460 and for contact with the first face of the assemblage 13, 14.

The mandrel 432 itself has a head 433 of a diameter greater than the bore of the sleeve and a shank 470 of the mandrel housed in this bore. The cross-section of the shank of the mandrel 470 is adapted to correspond to the cross-section of the bore of the sleeve at the level of the rest means 444. The shank of the mandrel 470 is, furthermore, provided with a rupture groove 435.

The setting tools for such a rivet have a specific shape and comprise, moreover, the tool forming pincers 438 for squeezing the shank of the mandrel 470, of the first and second setting tools 460 and 461.

The first setting tool 460 may be displaced in the direction of the arrows E, H and I (FIGS. 10 and 12), the second setting tool 461 is displaced in the direction of arrows P and K (FIGS. 10 and 12).

The first setting tool 460 has a shoulder 465 forming gripping means and adapted to cooperate with the gripping surface 462 of the stop head. The second setting tool 461 has a first portion 466a adapted to enter into contact with the shoulder 444, and a second portion 466b. The first portion 466a of the tool is then attached to the sleeve.

As is seen in FIG. 10, the sleeve 431 of the rivet according to the invention provided with its mandrel 432 is placed into extension preliminarily to its introduction into the bore 15 of the assemblage 13, 14. To this end, the first tool is brought over the stop head 450 and then lowered in the direction of the arrow H for placing the shoulder 465 of the tool into contact with the gripping surface 462 of the stop head.

The second tool 461 is introduced simultaneously into the bore of the sleeve until its first portion 466 enters into contact with the pressure surface 461 of the shoulder 444.

The first tool 460 pulls on the stop head in the direction of arrow E, while the second tool 461 pushes on the shoulder 444 in the direction of the arrow P.

The result of these two opposing forces being exerted on each of the ends of the sleeve is an extension or stretching of the tubular body 442 of the sleeve.

The sleeve thus stretched and provided with its mandrel 432 is then introduced into the interior of the bore 15 of the assemblage 13, 14. This introduction (achieved from only one side) continues until the rest surface 463 of the stop head is in contact with the first face A of the assemblage 13, 14. Once this contact is established (FIG. 11), the tool in the shape of pincers 438 exerts a pulling force T on the shank of the mandrel 470. For this reason, the head of the mandrel 433 penetrates into the interior of the body of the sleeve and forms a blocking head 451 in blocking contact with the second face B of the assemblage 13, 14. The continuation of the pulling force T on the shank of the mandrel causes the rupture of this shank at 435.

The first tool 460 and the second portion 466b of the tool 461 are then withdrawn from the assemblage according to arrows I. E, K, and T (FIG. 12). The stretched sleeve is then firmly in setting contact with the parts of the assemblage between a stop head 450 and a blocking head 451.

Upon cessation of all of the forces E, P and T applied to the rivet according to the invention, the relaxation of the different materials does not produce any play j between the head of the sleeve and the assemblage 13, 14. For this reason, the fastening of the rivet with the pieces is correct and does not deteriorate over time, as in the case of the first embodiment.

It should be noted that the first portion 466a of the second setting tool remains on the interior of the sleeve.

In this case, the rivet being solid, the holding under shear stress of this rivet is improved and there is even a propitious expansion of the body thereof, which increases the holding capacity of such a rivet.

It will be noted that the first portion 466a may indifferently be considered as a first portion of the second setting tool, or as an element of the sleeve. In effect, this portion 466a may, from the start, be in contact with the sleeve and be put in place therewith, the second tool only coming to bear on this part 466a thereafter.

This embodiment permits, as in the first embodiment, improving the fastening of the materials to be assembled with a blind rivet, and this is due to the setting of the rivet with a stretching of the sleeve, but moreover, it permits increasing the resistance of the rivet fastening to shear stresses. However, it requires specific setting equipment, more complex than in the case of the first embodiment.

In addition, by reason of the stretching of the sleeve preliminarily to its introduction into the bore of the assembly, it is possible to use sleeves in which the external diameter is slightly greater than the bore. In effect, during the stretching, the external diameter has a tendency to be reduced such that it may be introduced into the bore of the assembly. Once it has been put in place and set, the sleeve has a tendency to recover its original diameter, which assures a certain expansion and a better hold of the rivet produced.

In a variation, the rivet according to the second embodiment may be placed in the bore of the assemblage and stretched after its placement. In this case, one achieves a riveting process similar to that of the first embodiment.

In another variation, as shown in FIG. 13, the second setting tool 461 is formed of a single piece. In this case, during its withdrawal (in the final phase of the riveting), no part of this tool remains in place in the sleeve. Advantageously, in framework of this variation, the shank of the mandrel 570 is broken at the level of the stop means 544 of the sleeve, along the rupture line 535.

It should be noted that, for the first embodiment as for the second, the stop means 44, 444 may be a continuous shoulder on the interior of the bore of the sleeve, or may even be a discontinuous shoulder. In this case, one creates a plurality of stop members uniformly distributed around the bore of the sleeve.

It will also be appreciated that the rest means may be a single lug on the interior of the bore.

The process for riveting materials according to the invention used a blind rivet comprising a tubular sleeve provided with a longitudinal bore and a mandrel having, for one part, a head of a diameter greater than the bore of the sleeve, and for the other part, a shank housed in the interior of the bore of the sleeve and extending therefrom opposite the head, the process comprising:

a) introducing the rivet 30, 430 into an opening 15 passing through the materials 13, 14 to be assembled, from one side of this assemblage of materials, and it further comprises:

b) exerting on the sleeve an extending force between an abutment head 50, 450 situated at one end of the sleeve 31, 431, and a rest means 44, 444 provided on the interior of the sleeve for placing the sleeve under a longitudinal extension over a substantial portion of its length, c) blocking the sleeve in this longitudinally extended position on opposite sides of the assemblage 13, 14 while forming a blocking head 51, 451 opposite the abutment head in contact with a first bearing face A of the assemblage, said blocking head resting against a second bearing face B of the assemblage, and d) exerting a pulling force T on the mandrel for causing a rupture of the shank of the mandrel.

The introduction of the blind rivet into the bore of the assemblage is carried out before or after the stretching or extending of the sleeve, as is apparent from the description of the first and second embodiments.

It will be understood that the present invention is not limited to the embodiments described, and covers all variations as are apparent to the skilled artisan. Thus, the shape and dimensions of the bearing means 44, 444 may vary without departing from the scope of the invention. In the same manner, the rivet may be of any appropriate material and the assembly to be produced may comprise more than two pieces.

I claim:

1. A process for blind riveting two members together, comprising the steps of:

providing first and second members having first and second outer bearing faces and having aligned holes;

providing a blind rivet comprising a tubular sleeve having first and second ends, a preformed head situated at said second end of said sleeve, a longitudinal bore and a bearing means located on the interior of said sleeve, and a mandrel located in said bore and having on a first portion thereof a head of greater diameter than that of said bore and situated adjacent said first end of said sleeve, a shoulder engageable with said bearing means and a first rupture groove, and a second portion including a shank having a second rupture groove, introducing said rivet into and through said holes from the second outer bearing face of said second member;

exerting on said mandrel a pulling force thereby causing said head of said mandrel to deform said first end of said sleeve into an abutment head, continuing said pulling force thereby rupturing said mandrel at said first rupture groove, and thereafter forcing said shoulder against said bearing means, such that said sleeve elastically deforms and is placed in longitudinal extension between said abutment head and said bearing means;

while in said longitudinal extension and with said abutment head abutting against said first member, deforming said preformed head of said second end of said sleeve into a blocking head bearing against said second outer bearing face of said second member; and continuing pulling said mandrel through said sleeve, thereby rupturing said shank of the mandrel at said second rupture groove.

2. The process according to claim 1 including providing said mandrel with a holding groove at the base of said head of said mandrel, and including forming the abutment head by engaging said first end of said sleeve with said holding groove, and rupturing said shank of said mandrel along said second rupture groove.

3. The process according to claim 1 including contacting the preformed head with said second outer bearing face, then releasing the preformed head from said second outer bearing face while exerting said stretching force on said sleeve, and reshaping said preformed head to form said blocking head while applying it securely against said second outer bearing face.

4. The process according to claim 1 and including forming said abutment head prior to rupturing said mandrel at said first rupture groove, and stretching said sleeve subsequent to rupturing said shank at said second rupture groove.

5. A process for blind riveting two members together, comprising the steps of:

providing first and second members having first and second outer bearing faces and having aligned holes;

providing a blind rivet comprising a tubular sleeve having first and second ends, an abutment head situated at said second end of said sleeve, a longitudinal bore and a bearing means located on the interior of said sleeve, and a mandrel having a head of greater diameter than that of said bore and a shank extending from said head and through said bore and including a rupture groove;

exerting on said abutment head a force in a first direction while exerting on said bearing means a force in a second direction opposite said first direction, thereby elastically deforming said sleeve and holding said sleeve in a state of longitudinal extension between said abutment head and said bearing means;

introducing said rivet into and through said holes from the second outer bearing face of said second member;

while in said longitudinal extension and with said abutment head abutting against said second member, pulling said mandrel in said first direction, thereby deforming said first end of said sleeve into a blocking head bearing against said first outer bearing face; and continually pulling said mandrel through said sleeve, thereby rupturing said shank at said rupture groove.

6. The process according to claim 5 including introducing said rivet after stretching said sleeve.

7. The process according to claim 5 including exerting said forces on said abutment head and bearing means by utilizing a first and a second setting tool acting simultaneously, said first setting tool exerting a pulling force on said abutment head, and said second setting tool exerting a pushing force on said bearing means.

8. The process according to claim 7 including, once the blocking of said sleeve in the extended position is achieved:

releasing the second setting tool from its contact with said bearing means, and releasing the first setting tool from the abutment head.

9. The process according to claim 7 including, once the blocking of said sleeve in the extended position is achieved:

leaving a first portion of said second setting tool in place in contact with said sleeve and said mandrel, removing a second portion of said second setting tool, and releasing the first setting tool from said abutment head.

* * * * *

UNITED STATES PATENT AND TRADEMARK OFFICE
CERTIFICATE OF CORRECTION

PATENT NO. : 5,581,867
DATED : December 10, 1996
INVENTOR(S) : Jean-Pierre Gaquere It is certified that error appears in the above-identified patent and that said Letters Patent is hereby corrected as shown below:

Title page, item [73], Assignee: insert--Ste. Ateliers de la Haute-Garonne-Ets Auriol et Cie., Balma, France.--

Signed and Sealed this

Tenth Day of February, 1998

Attest:

BRUCE LEHMAN

Attesting Officer

Commissioner of Patents and Trademarks